(12) United States Patent
San Andres et al.

(10) Patent No.: US 8,965,591 B2
(45) Date of Patent: Feb. 24, 2015

(54) REGENERATING ELECTRIC POWER DISTRIBUTION SWITCHING PLANS BASED ON CHANGING POWER DISTRIBUTION NETWORK CONDITIONS

(75) Inventors: Ramon Juan San Andres, Duluth, GA (US); Atul Nigam, Suwanee, GA (US)

(73) Assignee: General Electric Company, Schenectady, NY (US)

( * ) Notice: Subject to any disclaimer, the term of this patent is extended or adjusted under 35 U.S.C. 154(b) by 506 days.

(21) Appl. No.: 13/398,185

(22) Filed: Feb. 16, 2012

(65) Prior Publication Data
US 2013/0218357 A1 Aug. 22, 2013

(51) Int. Cl.
| | | |
|---|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| G05B 11/01 | (2006.01) |
| G01R 21/00 | (2006.01) |
| G01R 21/06 | (2006.01) |
| G01R 31/00 | (2006.01) |

(52) U.S. Cl.
USPC ............. 700/291; 700/22; 700/286; 700/295; 700/297; 702/58; 702/59; 702/62

(58) Field of Classification Search
CPC ................ H02J 3/006; H02J 2003/001; H02J 2003/007; Y02E 60/76; Y04S 40/22
USPC .......... 700/22, 291–293, 295, 297; 702/58–62
See application file for complete search history.

(56) References Cited

U.S. PATENT DOCUMENTS

| | | | |
|---|---|---|---|
| 7,729,808 B2 | 6/2010 | Nasle et al. | |
| 7,979,222 B2* | 7/2011 | Donde et al. | 702/61 |
| 8,036,872 B2 | 10/2011 | Nasle | |
| 8,321,194 B2* | 11/2012 | Meagher et al. | 703/14 |
| 8,595,094 B1* | 11/2013 | Forbes, Jr. | 705/34 |
| 8,706,309 B2* | 4/2014 | Schweitzer et al. | 700/291 |
| 8,793,202 B2* | 7/2014 | Wang et al. | 706/13 |
| 2004/0225648 A1* | 11/2004 | Ransom et al. | 707/3 |
| 2005/0090995 A1* | 4/2005 | Sonderegger | 702/57 |
| 2009/0216910 A1 | 8/2009 | Duchesneau | |
| 2010/0235285 A1 | 9/2010 | Hoffberg | |
| 2010/0317420 A1 | 12/2010 | Hoffberg | |
| 2011/0016342 A1 | 1/2011 | Rowan et al. | |
| 2011/0204720 A1* | 8/2011 | Ruiz et al. | 307/66 |
| 2011/0219208 A1 | 9/2011 | Asaad et al. | |
| 2012/0253539 A1* | 10/2012 | McMullin | 700/297 |
| 2012/0323389 A1* | 12/2012 | Shelton et al. | 700/295 |
| 2013/0110298 A1* | 5/2013 | Beveridge | 700/287 |

\* cited by examiner

Primary Examiner — Ramesh Patel
(74) Attorney, Agent, or Firm — Cantor Colburn LLP

(57) ABSTRACT

A method for regenerating switching plans based on changing power distribution network conditions includes updating a power distribution network model in response to a power distribution network event, identifying areas of the power distribution network affected by the power distribution network event, identifying switching plans that are impacted by the power distribution network event and regenerating the switching plans that are impacted by the power distribution network event.

20 Claims, 3 Drawing Sheets

REGENERATING ELECTRIC POWER DISTRIBUTION SWITCHING PLANS BASED ON CHANGING POWER DISTRIBUTION NETWORK CONDITIONS

BACKGROUND OF THE INVENTION

The subject matter disclosed herein relates to power distribution networks, and more particularly to systems and methods for regenerating switching plans based on changing network conditions.

Fault detection, fault isolation and recovery (FDIR) solutions are implemented to detect and isolate faults in a failed component in a power distribution network in a shortest possible time. FDIR leads to reduction in diagnostic time or downtime, thereby increasing system availability. Current FDIR solutions generate switching plans based on the current state of the power distribution network. The time between the issuance of a switching plan and a fault can be minutes, hours, days or longer. If a switching plan is to be executed at a later time of issuance, it is up to operators to manually modify the switching plans to accommodate for the network changes that may have occurred between the time that the plan was issued and the time that the plan is to be executed.

BRIEF DESCRIPTION OF THE INVENTION

According to one aspect of the invention, a method for regenerating switching plans based on changing power distribution network conditions is described. The method includes updating a power distribution network model in response to a power distribution network event, identifying areas of the power distribution network affected by the power distribution network event, identifying switching plans that are impacted by the power distribution network event and regenerating the switching plans that are impacted by the power distribution network event.

According to another aspect of the invention, a computer program product including a non-transitory computer readable medium storing instructions for causing a computer to implement a method for regenerating switching plans based on changing power distribution network conditions is described. The method includes updating a power distribution network model in response to a power distribution network event, identifying areas of the power distribution network affected by the power distribution network event, identifying switching plans that are impacted by the power distribution network event and regenerating the switching plans that are impacted by the power distribution network event.

According to yet another aspect of the invention, a system for regenerating switching plans based on changing power distribution network conditions in a power distribution network is described. The system includes a fault detection, fault isolation and recovery system communicatively coupled to the power distribution network, a network model manager communicatively coupled to the fault detection, fault isolation and recovery system and an event filter communicatively coupled between the power distribution network and the network model manager, and configured to filter power distribution network events that impact switching plans for the power distribution network.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
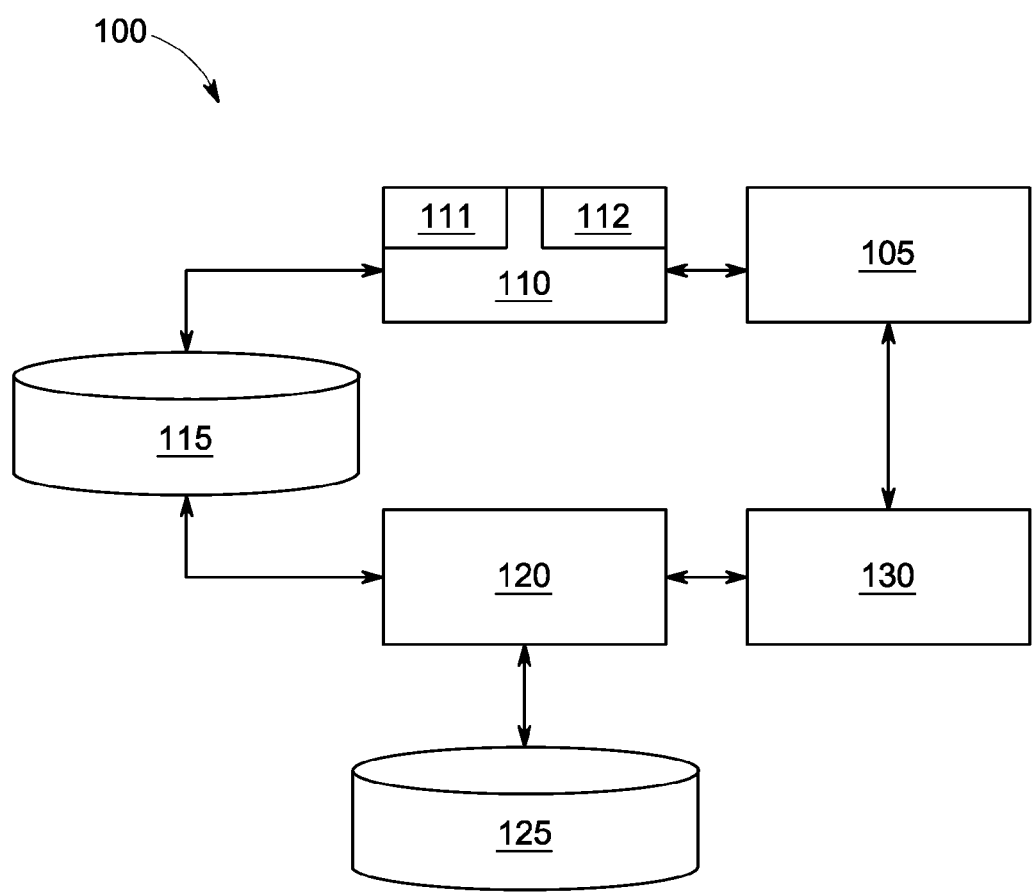
FIG. 1 diagrammatically illustrates an exemplary system for regenerating switching plans based on changing power distribution network conditions.

FIG. 1 diagrammatically illustrates an exemplary system 100 for regenerating switching plans based on changing power distribution network conditions. The system 100 includes a power distribution network 105. It will be appreciated that the power distribution network 105 can be any electrical distribution system for the delivery of electricity to consumers. As such, the power distribution network can include, but is not limited power generation plants, transmission lines, transformers, substations, demand centers and the like. The system 100 further includes an FDIR system 110 coupled to the power distribution network 105 and configured to keep track of issued restoration switching plans until they are executed or rejected. The switching plans can be stored in a switching plan database 115 that is coupled to the FDIR system 110. The FDIR system 110 includes a restoration engine 111 configured to evaluate and re-evaluate switching plans, and a switching plan removal module 112 for removing switching plans, as further described herein. The system 100 further includes a network model manager 120 that is coupled to the switching plan database 115 and tracks states of the power distribution network 105. The network model manager 120 can include not only existing events of the power distribution network 105, but also an intelligent analytical engine that may use an extensive set of data to predict the likelihood of events within the current distribution network. As such, the system 100 can also be implemented as an advisory tool that could generate predicted switching plans based on failures that may occur given a current set of circumstances.

The FDIR system 110 monitors the current network state as modeled by the network model manager 120 and re-generates all pending switching plans to account for network changes as further described herein. The new versions of the switching plans are submitted so they can replace the obsolete versions. Current and updated network models are stored in a network model database 125. The system 100 also includes an event filter 130 coupled to the power distribution network 105 and the network model manager 120 and configured to select events in the power distribution network that may affect issued switching plans already in place. Events that can affect switching plans include but are not limited to: switch states (i.e., open/close); and load values that exceed a predetermined threshold value. In exemplary embodiments, the FDIR system 110 responds to fault events by generating restoration switching plans that are sent to the power distribution network 105 for execution. At the same time, the restoration switching plans are persisted in the switching plan database 115. Switching plans generated by the FDIR system 110 are versioned to track and update the switching plans. Each restoration plan provides the switching steps to restore power to a de-energized area of the power distribution network 105. Such an area is identified by the network components within the area of the power distribution network 105.

Figure 2:
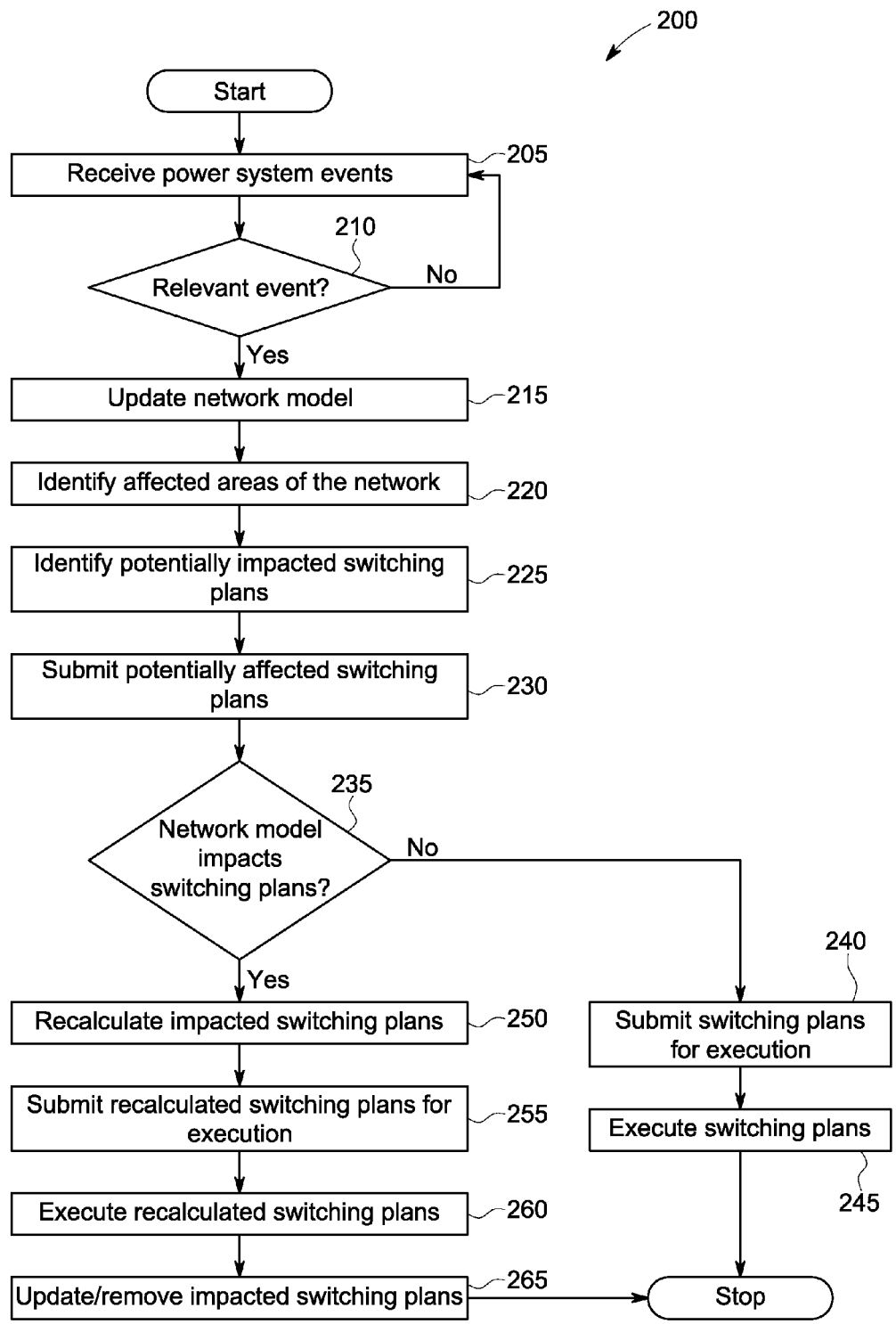
FIG. 2 illustrates a flow chart for a method of regenerating switching plans based on changing power distribution network conditions in accordance with exemplary embodiments.

FIG. 2 illustrates a flow chart for a method 200 of regenerating switching plans based on changing power distribution network conditions in accordance with exemplary embodiments. At block 205, events from the power distribution network 105 are fed real-time to the event filter 130, which selects those events that may potentially impact any pending switching plan. In exemplary embodiments, the event filter 130 may use intelligence programmed into the event filter 130, or it may use a rules-based engine, or even an artificial intelligence-based engine (e.g. neural network) to determine the relevant events to feed to the FDIR system 110.

At block 210, the event filter 130 therefore determines which events are relevant. If there are no relevant events, the method 200 continues at block 205. If an even is relevant at block 210, then at block 215, the network model manager 120 updates the network model(s) stored in the network model database 125 in order to reflect the current state of the power distribution network 105. At block 220, the network model manager 120 identified the area (or areas) of the power distribution network 105 that have changed by the set of components (e.g., transformers, transmission lines, substations and the like) within the affected areas.

At block 225, the network model manager identifies and analyzes each pending switching plan against each of the modified areas to determine if the switching plan is affected by the network changes, which can be done by identifying intersections (i.e., overlapping areas) between the switching plan and the network changed area. For example, if the switching plan requires a transformer that is part of the affected area and now not functioning, the network model manager 120 identifies this change. Areas (both in a restoration plan and in information related to an affected area in the power distribution network 105) conceptually contain all the network components physically located within the area of the power distribution network 105. In exemplary embodiments, identification of the switching plans affected by changes in an area is done by obtaining set intersections. However, optimizations may also be performed (e.g. by identifying an area by the conducting equipment within its border, increasing the granularity of the network by dividing the network in a discrete set of zones, and the like).

At block 230, the network model manager 120 submits the impacted switching plans to the restoration engine 111 of the FDIR system 110 in order to be re-evaluated given the current network conditions. At block 235, the FDIR 110 then determines if the current network model based on the fault impacts the switching plans. In exemplary embodiments, the re-evaluation may include a re-run of the entire restoration algorithm on the original faulted area, or may be a more intelligent incremental calculation of the existing plan. Since a single fault may result in multiple restoration switching plans, if a network modification impacts any of these plans then all the plans originally generated are re-evaluated. It will also be appreciated that some switching plans may be impacted and others are not impacted. As such, some switching plans may be cable of execution. If the current network model does not impact the switching plans at block 235, then at block 240 the switching plans are submitted to the power distribution network 105 for execution, which are executed by the power distribution network at block 245. If the current network model does impact the switching plans at block 235, then at block 250 the FDIR system 110 recalculates the switching plans. At block 255, the FDIR system 100 then submits the re-calculated version of the switching plans to the power distribution network 105 for execution, thereby invalidating all previous versions of the switching plans. At block 260, the power distribution network 105 then executes the recalculated switching plan. At block 265, the FDIR system 110 updates the switching plans. The updating process may include removing one or more of the switching plans from the switching plan database. For example, if a previous switching plan was merely impacted temporarily by a particular component of the switching being affected by the adverse event, then the revised switching plan can be removed. However, if the revised switching plan is a more accurate reflection of the power distribution network 105, then the older version of the switching plan can be replaced with the revised switching plan. It will be appreciated that there are various ways in which the switching plans can be updated. In exemplary embodiments, the switching plan removal module 112 removes any switching plans from the switching plan store database 115.

Figure 3:
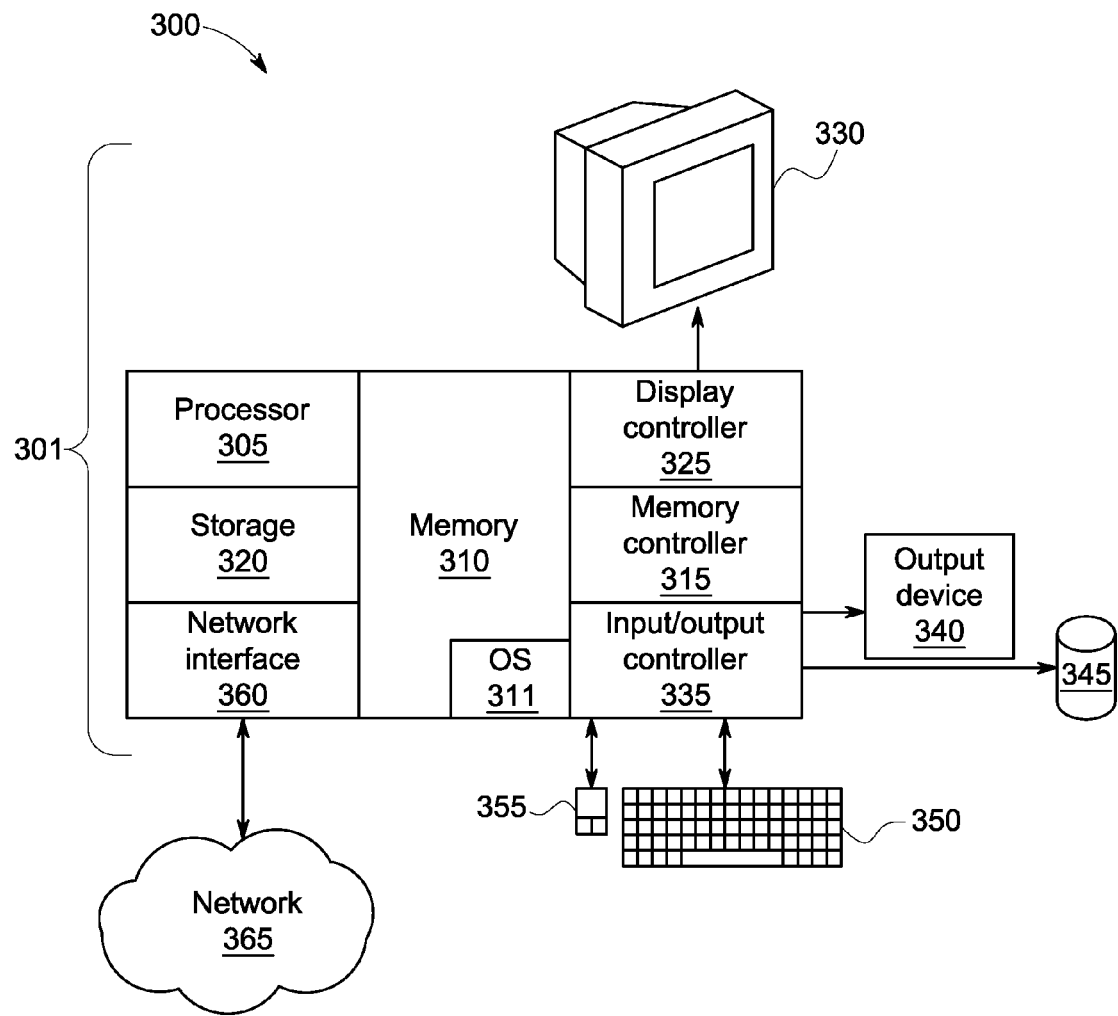
FIG. 3 illustrates an exemplary embodiment of a system that can be implemented for regenerating switching plans based on changing power distribution network conditions.

Several of the components of the system 100 described herein, such as the FDIR system 110 and the network model manager 120, can implement any suitable computing device as now described. FIG. 3 illustrates an exemplary embodiment of a system 300 that can be implemented for the switching plan regeneration methods described herein. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 300 therefore includes general-purpose computer 301.

In exemplary embodiments, in terms of hardware architecture, as shown in FIG. 3, the computer 301 includes a processor 305, memory 310 coupled to a memory controller 315, and one or more input and/or output (I/O) devices 340, 345 (or peripherals) that are communicatively coupled via a local input/output controller 335. The input/output controller 335 can be, but is not limited to, one or more buses or other wired or wireless connections, as is known in the art. The input/output controller 335 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 305 is a hardware device for executing software, particularly that stored in memory 310. The processor 305 can be any custom made or commercially available processor, a central processing unit (CPU), an auxiliary processor among several processors associated with the computer 301, a semiconductor based microprocessor (in the form of a microchip or chip set), a macroprocessor, or generally any device for executing software instructions.

The memory 310 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, and/or other types of storage media. Note that the memory 310 can have a distributed architecture, where various components are situated remote from one another, but can be accessed by the processor 305.

The software in memory 310 may include one or more separate programs, each of which comprises an ordered listing of executable instructions for implementing logical functions. In the example of FIG. 3, the software in the memory 310 includes the switching plan regeneration methods described herein in accordance with exemplary embodiments and a suitable operating system (OS) 311. The OS 311 essentially controls the execution of other computer programs, such the switching plan regeneration systems and methods as described herein, and provides scheduling, input-output control, file and data management, memory management, and communication control and related services.

The switching plan regeneration methods described herein may be in the form of a source program, executable program (object code), script, or any other entity comprising a set of instructions to be performed. When a source program, then the program needs to be translated via a compiler, assembler, interpreter, or the like, which may or may not be included within the memory 310, so as to operate properly in connection with the OS 311. Furthermore, the switching plan regeneration methods can be written as an object oriented programming language, which has classes of data and methods, or a procedure programming language, which has routines, subroutines, and/or functions.

In exemplary embodiments, a conventional keyboard 350 and mouse 355 can be coupled to the input/output controller 335. Other output devices such as the I/O devices 340, 345 may include input devices, for example but not limited to a printer, a scanner, microphone, and the like. Finally, the I/O devices 340, 345 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 300 can further include a display controller 325 coupled to a display 330. In exemplary embodiments, the system 300 can further include a network interface 360 for coupling to a network 365. The network 365 can be an IP-based network for communication between the computer 301 and any external server, client and the like via a broadband connection. The network 365 transmits and receives data between the computer 301 and external systems. In exemplary embodiments, network 365 can be a managed IP network administered by a service provider. The network 365 may be implemented in a wireless fashion, e.g., using wireless protocols and technologies, such as WiFi, WiMax, etc. The network 365 can also be a packet-switched network such as a local area network, wide area network, metropolitan area network, Internet network, or other similar type of network environment. The network 365 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 301 is a PC, workstation, intelligent device or the like, the software in the memory 310 may further include a basic input output system (BIOS) (omitted for simplicity). The BIOS is a set of essential software routines that initialize and test hardware at startup, start the OS 311, and support the transfer of data among the hardware devices. The BIOS is stored in ROM so that the BIOS can be executed when the computer 301 is activated.

When the computer 301 is in operation, the processor 305 is configured to execute software stored within the memory 310, to communicate data to and from the memory 310, and to generally control operations of the computer 301 pursuant to the software. The switching plan regeneration methods described herein and the OS 311, in whole or in part, but typically the latter, are read by the processor 305, perhaps buffered within the processor 305, and then executed.

When the systems and methods described herein are implemented in software, as is shown in FIG. 3, the methods can be stored on any computer readable medium, such as storage 320, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the switching plan regeneration methods are implemented in hardware, the switching plan regeneration methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects include automatic re-evaluation of restoration switching plans, which allows for faster execution of the switching plans and therefore faster recovery times. The avoidance of manual steps also ensures that the switching plans available for execution are always updated for the criteria established by the utility company.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of regenerating switching plans based on a change in a power distribution network associated with the switching plans, the method comprising:
updating a power distribution network model in response to a power distribution network event, the power distribution network event representing a change in at least one area of the power distribution network;
identifying the at least one area of the power distribution network affected by the power distribution network event;
identifying switching plans that are impacted by the power distribution network event, each of the switching plans corresponding with a fault isolation and recovery solution for the at least one area of the power distribution network; and
regenerating the switching plans that are impacted by the power distribution network event.

2. The method as claimed in claim 1 further comprising receiving a plurality of power distribution network events.

3. The method as claimed in claim 2 further comprising filtering the plurality of power distribution network events for one or more events that may affect switching plans.

4. The method as claimed in claim 1 further comprising analyzing the switching plans that are impacted by the power distribution network event.

5. The method as claimed in claim 4 further comprising recalculating the switching plans that are impacted by the power distribution network event.

6. The method as claimed in claim 4 wherein recalculating the switching plans that are impacted by the power distribution network event include at least one of re-running restoration algorithms on the areas affected by the power distribution network event, and incrementally calculating the switching plans that are impacted by the power distribution network event.

7. The method as claimed in claim 5 further comprising identifying intersections between the switching plans that are impacted by the power distribution network event and the power distribution network model.

8. The method as claimed in claim 1 further comprising executing at least one of switching plans that are not impacted by the power distribution network event and regenerated switching plans that are impacted by the network event.

9. A non-transitory computer readable medium storing instructions which, when processed by a computer cause the computer to implement a method of regenerating switching plans based on a change in a power distribution network associated with the switching plans, the method comprising:
- updating a power distribution network model in response to a power distribution network event, the power distribution network event representing a change in at least one area of the power distribution network;
- identifying the at least one area of the power distribution network affected by the power distribution network event;
- identifying switching plans that are impacted by the power distribution network event, each of the switching plans corresponding with a fault isolation and recover solution for the at least one area of the power distribution network; and
- regenerating the switching plans that are impacted by the power distribution network event.

10. The computer readable medium as claimed in claim 9 wherein the method further comprises receiving a plurality of power distribution network events.

11. The computer readable medium as claimed in claim 10 wherein the method further comprises filtering the plurality of power distribution network events for one or more events that may affect switching plans.

12. The computer readable medium as claimed in claim 9 wherein the method further comprises analyzing the switching plans that are impacted by the power distribution network event.

13. The computer readable medium as claimed in claim 12 wherein the method further comprises recalculating the switching plans that are impacted by the power distribution network event.

14. The computer readable medium as claimed in claim 12 wherein recalculating the switching plans that are impacted by the power distribution network event include at least one of re-running restoration algorithms on the areas affected by the power distribution network event, and incrementally calculating the switching plans that are impacted by the power distribution network event.

15. The computer readable medium as claimed in claim 13 wherein the method further comprises identifying intersections between the switching plans that are impacted by the power distribution network event and the power distribution network model.

16. The computer readable medium as claimed in claim 9 wherein the method further comprises executing at least one of switching plans that are not impacted by the power distribution network event and regenerated switching plans that are impacted by the network event.

17. A system to regenerate switching plans based on changing power distribution network conditions in a power distribution network, the system comprising:
- a fault detection, fault isolation and recovery (FDIR) system communicatively coupled to the power distribution network, the FDIR system configured to perform regeneration of the switching plans;
- a network model manager communicatively coupled to the FDIR system; and
- an event filter communicatively coupled between the power distribution network and the network model manager, and configured to filter power distribution network events that impact the switching plans for the power distribution network, the power distribution network events representing a change in at least one area of the power distribution network.

18. The system as claimed in claim 17 wherein the FDIR system is configured to re-evaluate the switching plans impacted by the power distribution network events.

19. The system as claimed in claim 18 wherein the FDIR system is further configured to perform the regeneration based on recalculating the switching plans that are impacted by the power distribution network events, wherein recalculating the switching plans that are impacted by the power distribution network events include at least one of re-running restoration algorithms on the areas affected by the power distribution network events and incrementally calculating the switching plans that are impacted by the power distribution network events.

20. The system as claimed in claim 18 wherein the FDIR system is further configured to identify intersections between the switching plans that are impacted by the power distribution network events and a power distribution network model.

* * * * *